(12) United States Patent
Ben-David et al.

(10) Patent No.: US 11,243,978 B2
(45) Date of Patent: Feb. 8, 2022

(54) NON-CENTRALIZED DATA SYNCHRONIZATION FOR IOT AND OTHER DISTRIBUTED APPLICATIONS

(71) Applicant: EMC IP Holding Company LLC, Hopkinton, MA (US)

(72) Inventors: David Ben-David, Beer Sheva (IL); Kfir Wolfson, Beer Sheva (IL); Jonathan Volij, Metar (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 265 days.

(21) Appl. No.: 16/024,254

(22) Filed: Jun. 29, 2018

(65) Prior Publication Data
US 2020/0004867 A1 Jan. 2, 2020

(51) Int. Cl.
*G06F 16/27* (2019.01)
*H04L 29/08* (2006.01)

(52) U.S. Cl.
CPC .......... *G06F 16/273* (2019.01); *H04L 67/10* (2013.01)

(58) Field of Classification Search
CPC .......... G06F 16/2465; G06F 16/211; G06F 16/2264; G06F 16/2272; G06F 16/24545; G06F 16/24575; G06F 16/27; G06F 16/278; H04L 41/0893; H04L 67/1095
USPC ............. 707/600, 713, 714, 741, 771, 803
See application file for complete search history.

(56) References Cited

U.S. PATENT DOCUMENTS

| | | | |
|---|---|---|---|
| 2011/0092213 A1* | 4/2011 | Forsberg | H04L 63/06 455/436 |
| 2014/0006411 A1* | 1/2014 | Boldyrev | G06F 16/2264 707/741 |
| 2014/0064259 A1* | 3/2014 | Lee | H04L 45/74 370/338 |
| 2015/0065106 A1* | 3/2015 | Catovic | H04W 88/06 455/418 |
| 2016/0034534 A1* | 2/2016 | Cormier | G06F 16/36 707/713 |
| 2017/0235585 A1* | 8/2017 | Gupta | G06F 9/45558 718/1 |
| 2018/0270188 A1* | 9/2018 | Kodaypak | H04L 63/0428 |
| 2018/0270295 A1* | 9/2018 | Seed | H04L 67/104 |
| 2019/0026716 A1* | 1/2019 | Anbukkarasu | G06Q 20/389 |
| 2019/0050496 A1* | 2/2019 | Jalan | G06F 9/453 |

(Continued)

*Primary Examiner* — Dangelino N Gortayo
(74) *Attorney, Agent, or Firm* — Womble Bond Dickinson (US) LLP

(57) ABSTRACT

Disclosed is a method, apparatus, and system for processing a data update message in a multi-agent system comprising a plurality of agents, the operations comprising: receiving, at a second agent, the data update message comprising data for a node in a shared data tree and a first node context map from a first agent, the first node context map comprising last known contexts of all the agents for the node according to knowledge of the first agent; determining, at the second agent, whether any of three conditions relating to the first node context map and a second node context map is true, the second node context map comprising last known contexts of all the agents for the node according to knowledge of the second agent; and in response to determining that none of the three conditions relating to the first node context map and the second node context map is true, updating, at the second agent, the node based on the data update message from the first agent.

21 Claims, 6 Drawing Sheets

500

Receive, at a second agent, the data update message comprising data for a node in a shared data tree and a first node context map from a first agent, the first node context map comprising last known contexts of all the agents for the node according to knowledge of the first agent — 510

Determine, at the second agent, whether any of three conditions relating to the first node context map and a second node context map is true, the second node context map comprising last known contexts of all the agents for the node according to knowledge of the second agent — 520

In response to determining that none of the three conditions relating to the first node context map and the second node context map is true, update, at the second agent, the node based on the data update message from the first agent — 530

(56) References Cited

U.S. PATENT DOCUMENTS

2019/0098091 A1* 3/2019 Shinde .................... H04L 41/12
2019/0197354 A1* 6/2019 Law ......................... G06K 9/78
2019/0222643 A1* 7/2019 Karani ................... H04L 67/141
2019/0261260 A1* 8/2019 Dao ....................... H04W 48/18

* cited by examiner

NON-CENTRALIZED DATA SYNCHRONIZATION FOR IOT AND OTHER DISTRIBUTED APPLICATIONS

FIELD OF THE INVENTION

Embodiments of the disclosure relate to databases, and in particular, to context-based data synchronization in a graph database implemented with a decentralized multi-agent system.

BACKGROUND

In the world of distributed systems, the problem of synchronizing data is fundamental. Some application require a set of "intelligent" agents sharing a system state or configuration, while each of the agents can change the shared state independently.

Example applications are data protection Systems, such as Dell EMC RecoverPoint which has several distributed clusters.

Another important application is in the world of distributed graph databases, used for instance in Internet of Things (IoT) implementations, when per-field context-based configurations are used.

Other applications range from IoT implementations of autonomous smart devices that are not managed from a centralized server, to Software as a Service (SaaS) applications that allow multi-user, parallel editing of a shared data store or file.

In these distributed systems, agents use direct communication to exchange the state with each other. All data fields in the shared state can be read or written by all agents independently, at any time. Existing protocols for this use case are not robust enough if there are more than two agents in the system, and in cases of network communication delays, which are common in real-world installations. The problems are both in data integrity and in conflict resolution (false negative detection of state conflicts).

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Figure 1:
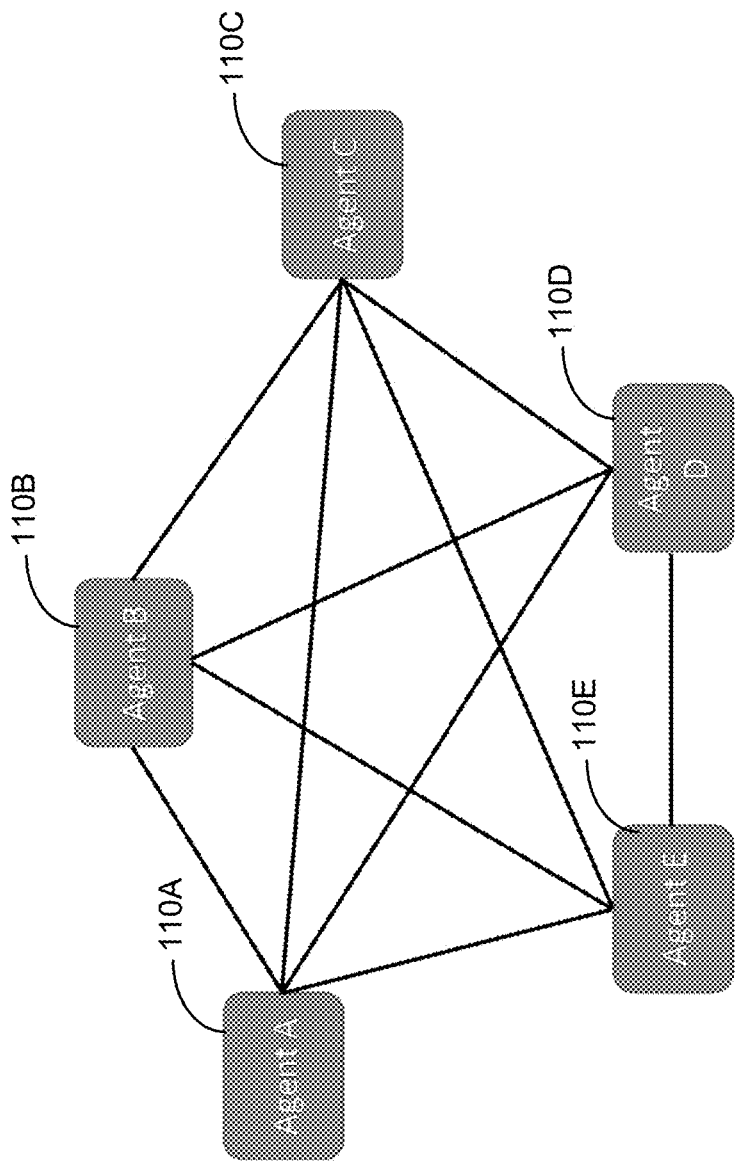
FIG. 1 is a block diagram illustrating an example multi-agent system in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to an apparatus, method, and system for processing a data update message in a multi-agent system comprising a plurality of agents, the operations comprising: receiving, at a second agent, the data update message comprising data for a node in a shared data tree and a first node context map from a first agent, the first node context map comprising last known contexts of all the agents for the node according to knowledge of the first agent; determining, at the second agent, whether any of three conditions relating to the first node context map and a second node context map is true, the second node context map comprising last known contexts of all the agents for the node according to knowledge of the second agent; and in response to determining that none of the three conditions relating to the first node context map and the second node context map is true, updating, at the second agent, the node based on the data update message from the first agent.

In the ecosystem of IoT, data is commonly saved in a graph database, such as OrientDB. To support scale and durability, a cluster of database servers is deployed.

Typically, in order to ensure consistency across the cluster, data must be written to a majority of nodes before a Write is acknowledged, which requires at least 3 nodes up and running at all times. Alternatively, a per-field context-based approach can be employed to allow writing the data locally and synchronizing asynchronously across the cluster.

Existing approaches work well for clusters of size 2 nodes (i.e., the system as 2 agents), and run into issues with larger scale. Embodiments of the disclosure allow efficient parallel work on 3 nodes and up.

In embodiments of the disclosure, a system may comprise N agents. The agents synchronize shared data represented in a tree structure, and act according to it. The system may meet the following criteria: 1) All agents are equal (i.e., they play equal roles), and there is no centralized control in the system. 2) No agent is blocked from modifying the data at any time. 3) The data held by each agent are the same, apart from the time immediately after an agent changes any of the data, and the change needs to be synchronized with other agents. 4) The data is synchronized across a communication protocol, following a connection topology graph. The connectivity graph is typically a connected graph, allowing data to flow to all agents eventually. Connections may be down temporarily, or latency may be introduced for specific connections for various periods of time. 5) The data can be transmitted between agents in full or partially, according to the context. 6) The system supports concurrent modification of the data by multiple agents. Data changes are merged by each agent independently. 7) Agents can identify efficiently whether the data was modified by a peer or not. "No change"

events are detected at the topmost (root) level of each data subtree. And 8) The system should minimize conflicts in the data as well as possible. Conflicts occur when different agents concurrently modify the same atomic fields to different values. Conflict resolution is considered very expensive, as it may require external intervention, such as a user manual operation.

Referring to FIG. 1, a block diagram illustrating an example multi-agent system 100 in which embodiments of the disclosure may be practiced is shown. Although as illustrated, the example system 100 comprises 5 agents, it should be appreciated that the number of agents does not limit the disclosure. Each independent agent 110A-E can communicate directly with all other agents (referred to hereinafter as peer agents), though the communication may be interrupted or delayed at times. There is no centralized management, and all agents are identical in the logical operations they perform.

Figure 2:
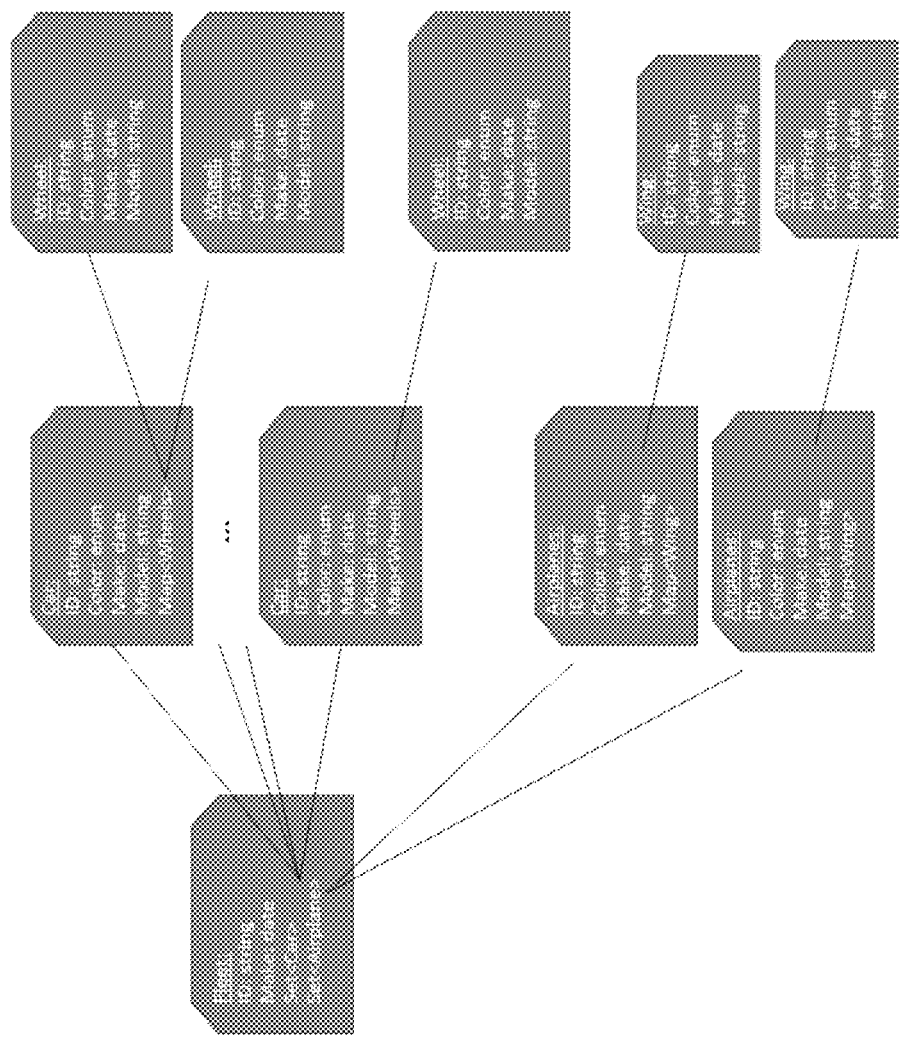
FIG. 2 is a block diagram illustrating an example data structure shared between agents of a system, according to one embodiment of the disclosure.

Referring to FIG. 2, a block diagram illustrating an example data structure 200 shared between agents of a system, according to one embodiment of the disclosure, is shown. The example data structure 200 is for illustration purposes only, and does not limit the disclosure. Taking the data structure 200 as an example, all data fields relating to the fleet (including all the cars, airplanes, wheels, wings, etc.) need to be synchronized between the agents of the system. In other words, the synchronization is not limited to any particular car, or airplane, etc.

In a non-centralized system of a plurality of agents, the ability to identify data changes correctly is crucial for the integrity of the data across agents, and for avoiding unnecessary conflicts, while keeping the ability to declare a conflict when it is logical.

False identification of changes can cause many problems, such as unsynchronized actions of agents, or violating the consistency of the data held by each agent.

In one embodiment, the data is represented in a rooted tree structure. Each node of the tree (i.e., an atomic data field) is associate with a context which is used to identify the order of data modification and help data synchronization between agents. The context may be a 64-bit unsigned integer, and it may be assumed that at the beginning all nodes at all agents are associated with a same initial context (e.g., context 0). It should be appreciated that the actual representation of the context does not limit the disclosure. When an agent makes a change to a node of the tree, it increments the local node context (i.e., the node context of itself) (e.g., by 1) as well as the local contexts for all the nodes that are the ancestors of the node whose data have been changed (i.e., all the nodes in the ascending path from the node whose data have been changed all the way to the root node). Each agent may hold a copy of the data tree, and, for each node of the tree, a context map that comprises the last known node contexts of itself and of each peer agent. For example, in a system comprising three agents A, B, and C, the agent A may hold, for each node of the data tree, a mapping indicative of the node context of itself (i.e., agent A) as well last known node contexts of agents B and C.

It should be apparent that the following invariants would be preserved: 1) An agent's own context is always the maximal context in the context map. 2) An agent's own (local) context is always larger than or equal to a peer's last known context of the agent.

For example, for a system with two agents (Agents A and B) the following node context maps preserves the two invariants: context map held by Agent A: [A →5, B →4]; context map held by Agent B: [A →4, B →5]. The following context maps are not valid as they violate the first invariant: A: [A →5, B →6]; B: [A →5, B →6]; because Agent A's own context (i.e., 5) is not the maximum in Agent A's context map. Further, the following context maps are not valid as they violate the second invariant: A: [A →5, B →4]; B: [A →6, B →7]; because Agent B's last known context of A (i.e., 6) is larger than Agent A's own local context (i.e., 5).

In an existing legacy synchronization protocol, Agent A sending data of a node to Agent B will include its own context of the node (which may be denoted hereinafter as A.context) and the last known node context of Agent B according to Agent A's knowledge (which may be denoted hereinafter as A.lastKnownContext[B]). This legacy protocol runs into issues when the system comprises three or more agents.

In one embodiment of the disclosure, an agent sending data of a node to a peer agent may send the full context map for the node comprising the node contexts of itself and of all peer agents according to the sending agent's knowledge (i.e., the full lastKnownContext map). It should be appreciated that compared to the legacy protocol described above, sending the full context map incurs an O(N) penalty in each message. In other words, each message would be slightly larger; however, the overall traffic in the system actually decreases. This is due to the fact that total number of messages in the system would decrease, as will be explained in detail below.

As described above, upon changing the data of a node of the data tree (i.e., a local atomic data field), an agent may increment the local node context and the context of every ancestor of the node.

When a second agent (referred to as Agent B) receives a message comprising a node data update and a full context map associated with the node from a first agent (referred to as Agent A), Agent B should update the node data in its own copy of the data tree based on the message from Agent A when none of the following three conditions are true: 1) A.lastKnownContext[B] is equal to A.context ("Condition #1"), which indicates that the change at Agent A contained in the message was actually originated by Agent B. 2) A.context is equal to B.lastKnownContext[A] ("Condition #2"), which indicates that Agent B already knows about the change at Agent A contained in the message. 3) There exists a third agent (referred to as Agent C), such that A.context is equal to A.lastKnownContext[C] and B.lastKnownContext[C] is higher than or equal to A.context ("Condition #3"), which indicates that Agent B has already adopted the change at Agent A contained in the message through another message sent by the third agent. If the system identifies that two agents modified a field concurrently, i.e., none of the three conditions are true for either agent, a merge will take place.

When an agent receive a message, it may update its node context map. In particular, it should be apparent that the last node context for a peer agent at the receiving agent may be updated to the last known context of the peer agent contained in the message if the last known context of the peer agent contained in the message is higher than the receiving agent's last known context of the peer agent.

For example, in a system comprising three agents: Agents A, B, and C, if Agent A knows the following context map: A: [A →4, B →4, C →3], and receives the following context map from Agent B: B: [A →4, B →5, C →5], Agent A may update the data of the node, and update the node context of itself to 5. Further, Agent A may update its last known node context of Agent C to 5 based on the message from Agent B. Thus, the resulting context map at Agent A will be: A: [A →5, B →5, C →5].

Embodiments of the disclosure may reduce the number of merges in multi-agent use cases. They may also reduce the number of costly conflicts in an automatic system.

Figure 3:
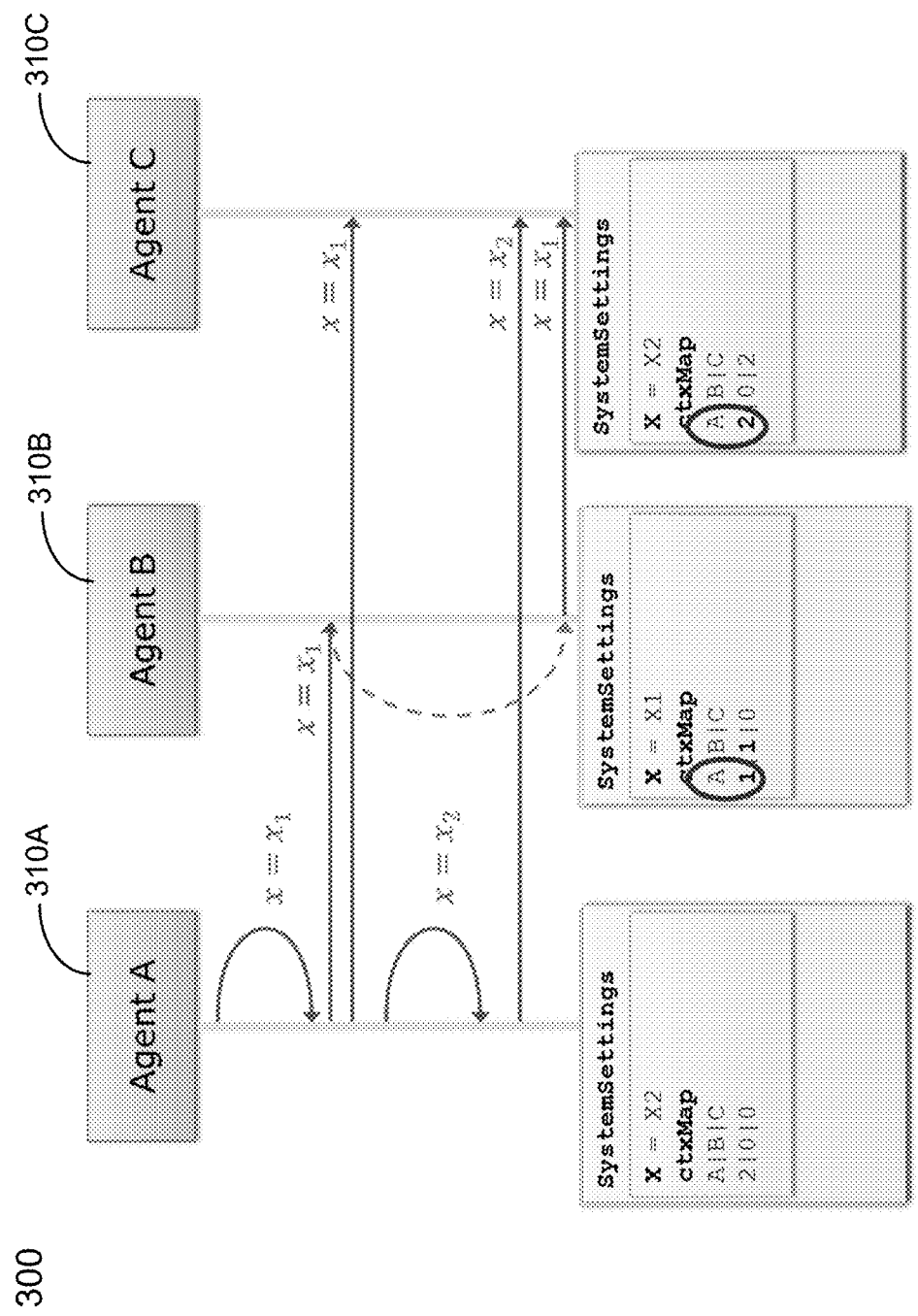
FIG. 3 is a diagram illustrating an example procedure associated with context map-based peer agent message processing, according to one embodiment of the disclosure.

Referring to FIG. 3, a diagram illustrating an example procedure 300 associated with context map-based peer agent message processing, according to one embodiment of the disclosure, is shown. Agent A 310A change the data of node x, first to x1, and then to x2. Agent C 310C receives both changes directly from Agent A 310A, in the correct order, but a moment later receives a conflicting update from Agent B 310B, which actually corresponds to Agent A 310A's first update of the data of node x to x1. After updating the data of node x to x2 based on the second message from Agent A 310A, Agent C 310C has the following node context map for the node x: C: [A →2, B →0, C →2]. The message Agent C 310C received from Agent B 310B comprises the following node context map for the node x indicative of the last known contexts at Agent B 310B: B: [A →1, B →1, C →0]. The way for Agent C 310C to determine that Agent C 310C itself is more updated than Agent B 310B with respect to the node x is by checking the two context maps. Agent C 310C's last known context of Agent A 310A is 2, while Agent B 310B is aligned with Agent A 310A with context 1. Therefore, Agent C 310C should not update node x based on the message from Agent B 310B. It should be noted that the two context maps render the Condition #3 described above true.

Figure 4:
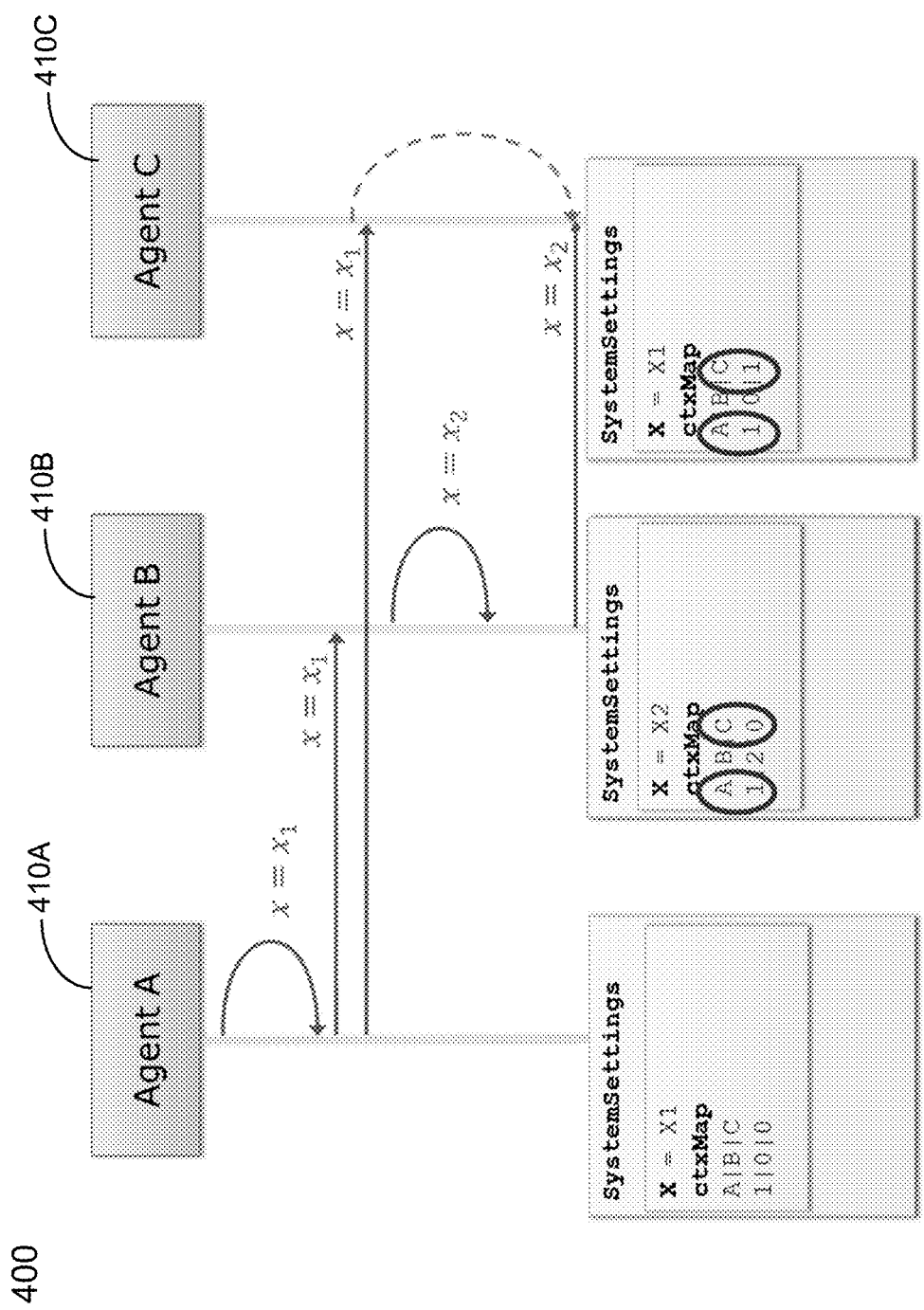
FIG. 4 is a diagram illustrating an example procedure associated with context map-based peer agent message processing, according to one embodiment of the disclosure.

Referring to FIG. 4, a diagram illustrating an example procedure 400 associated with context map-based peer agent message processing, according to one embodiment of the disclosure, is shown. Agent A 410A updates the data of node x once to x1, which is followed by a change to the node x to x2 initiated by Agent B 410B. Agent C 410C receives the first update from Agent A 410A, and the second update from Agent B 410B. After updating the data of node x to x1 based on the first message from Agent A 410A, Agent C 410C has the following node context map for the node x: C: [A →1, B →0, C →1]. The message Agent C 410C received from Agent B 410B comprises the following node context map for the node x indicative of the last known contexts at Agent B 410B: B: [A →1, B →2, C →0]. Here the message Agent C 410C received from Agent B 410B comprises a real change that Agent C 410C should adopt. This is also consistent with the fact that the two context maps render none of the three conditions (Conditions #1-3) described above true.

Agents synchronize data if context differences are detected. Merges increase data context. By utilizing the techniques described herein, as a result of reducing the number of merges, the agents are not required to send as much traffic. In one experiment, the context increased 20% more with the legacy approach. The amortized traffic reduction is expected to be proportionate to the context reduction.

Figure 5:
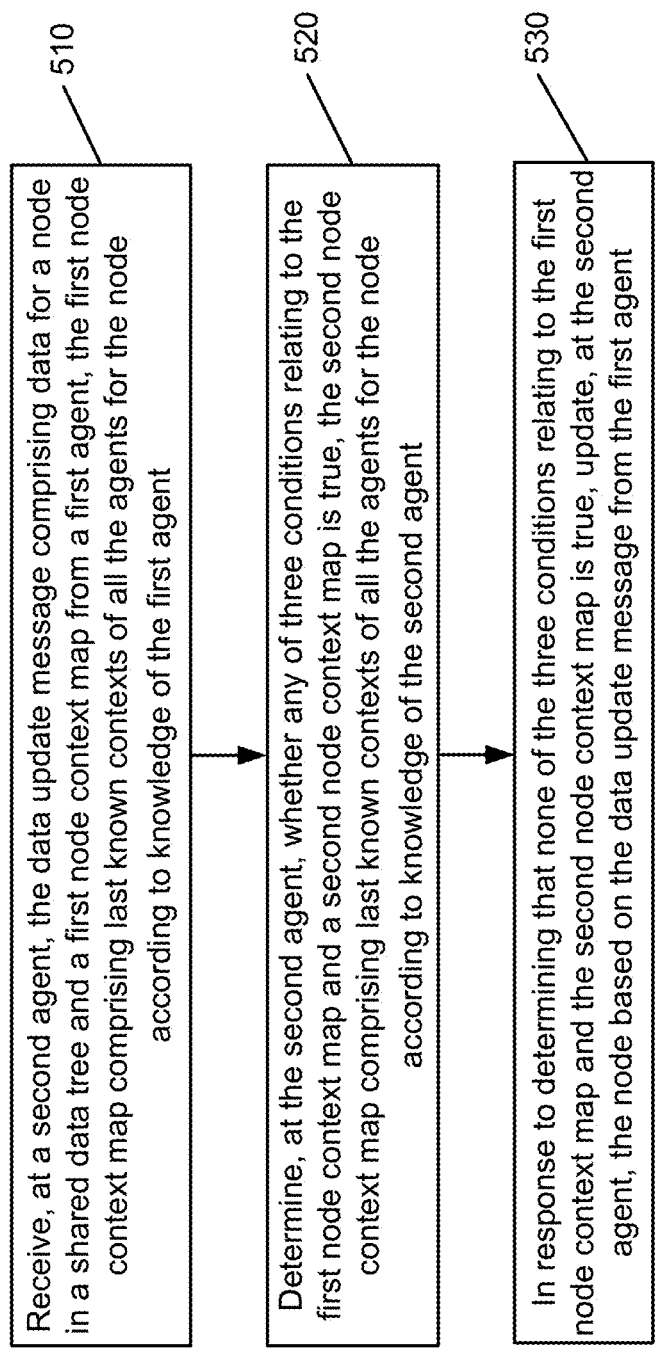
FIG. 5 is a flowchart illustrating an example method for processing a data update message in a multi-agent system comprising a plurality of agents, according to one embodiment of the disclosure.

Referring to FIG. 5, a flowchart illustrating an example method 500 for processing a data update message in a multi-agent system comprising a plurality of agents, according to one embodiment of the disclosure, is shown. At block 510, the data update message comprising data for a node in a shared data tree and a first node context map from a first agent may be received at a second agent, the first node context map comprising last known contexts of all the agents for the node according to knowledge of the first agent. At block 520, whether any of three conditions relating to the first node context map and a second node context map is true may be determined at the second agent, the second node context map comprising last known contexts of all the agents for the node according to knowledge of the second agent. At block 530, in response to determining that none of the three conditions relating to the first node context map and the second node context map is true, the node may be updated at the second agent based on the data update message from the first agent.

The three conditions mentioned above are: 1) the last known node context of the second agent according to knowledge of the first agent is equal to the last known node context of the first agent according to knowledge of the first agent (i.e., the local node context of the first agent); 2) the last known node context of the first agent according to knowledge of the first agent is equal to the last known node context of the first agent according to knowledge of the second agent; and 3) there exists a third agent such that the last known node context of the first agent according to knowledge of the first agent is equal to the last known node context of the third agent according to knowledge of the first agent, and the last known node context of the third agent according to knowledge of the second agent is higher than or equal to the last known node context of the first agent according to knowledge of the first agent.

Note that some or all of the components and operations as shown and described above (e.g., operations of method 500 illustrated in FIG. 5) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
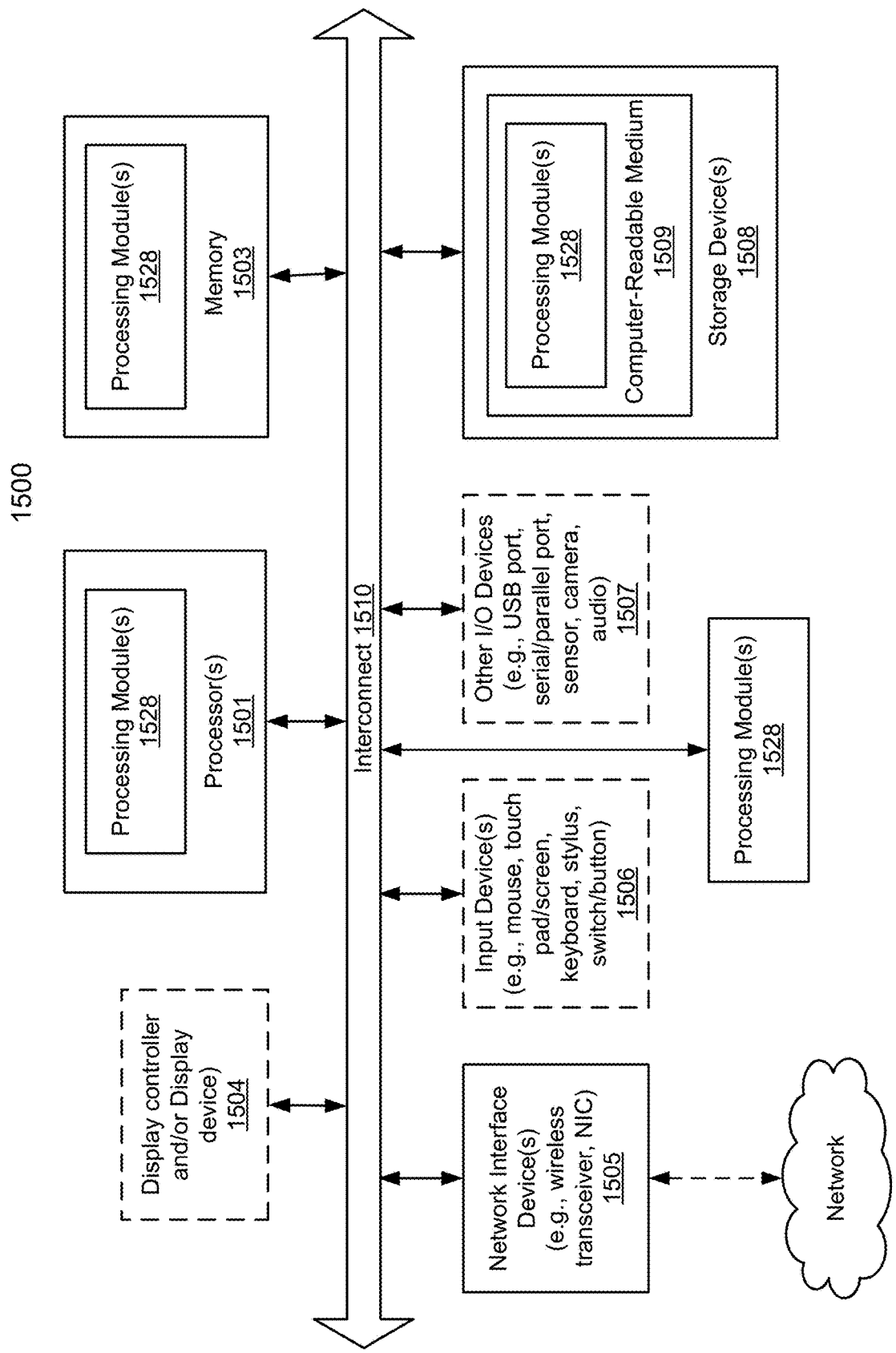
FIG. 6 is a block diagram illustrating an example of a data processing system which may be used with one embodiment of the invention.

FIG. 6 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing a data update message in a decentralized multi-agent system comprising a plurality of agents, the method comprising:
receiving, at a second agent of the plurality of agents, the data update message comprising data for a node in a shared data tree comprising a plurality of nodes and a first node context map from a first agent of the plurality of agents, the first node context map comprising last known contexts of all the agents for the node according to knowledge of the first agent, each of the plurality of agents maintaining a separate copy of the shared data tree, and the data update message being sent in response to a change in a copy of the node in the shared data tree maintained by the first agent that desynchronizes the first agent from the second agent;
determining, at the second agent, whether any of three conditions relating to the first node context map and a second node context map is true, the second node context map comprising last known contexts of all the agents for the node according to knowledge of the second agent; and
in response to determining that none of the three conditions relating to the first node context map and the second node context map is true, updating, at the second agent, the node based on the data update message from the first agent, wherein each agent of the plurality of agents maintains its respective copy of the shared data tree and a respective full context map comprising last known contexts of all of the plurality of agents including itself for each of the plurality of nodes of the shared data tree according to knowledge of the agent, wherein each agent's own context is a maximal context in the respective full context map, and wherein each agent's own context is larger than or equal to other agent's last known context of the agent.

2. The method of claim 1, wherein the three conditions comprise: 1) the last known node context of the second agent according to knowledge of the first agent is equal to the last known node context of the first agent according to knowledge of the first agent; 2) the last known node context of the first agent according to knowledge of the first agent is equal to the last known node context of the first agent according to knowledge of the second agent; and 3) there exists a third agent such that the last known node context of the first agent according to knowledge of the first agent is equal to the last known node context of the third agent according to knowledge of the first agent, and the last known node context of the third agent according to knowledge of the second agent is higher than or equal to the last known node context of the first agent according to knowledge of the first agent.

3. The method of claim 1, further comprising in response to determining that at least one of the three conditions relating to the first node context map and the second node context map is true, not updating, at the second agent, the node based on the data update message from the first agent.

4. The method of claim 1, wherein each respective copy of the shared data tree maintained be each respective agent is the same except immediately after one of the respective agents changes its respective copy of the shared data tree immediately triggering a synchronization across each respective agent.

5. The method of claim 1, further comprising:
changing, by the second agent, data for a second node in a copy of the shared data tree maintained by the second agent at the same time that the change in the copy of the node in the shared data tree maintained by the first agent occurs; and
in response to changing the data, sending a second data update message that conflicts with the data update message.

6. The method of claim 1, wherein the multi-agent system comprises at least three agents.

7. The method of claim 6, wherein the agents of the multi-agent system play equal roles.

8. A non-transitory machine-readable medium having instructions stored therein, which when executed by a processor, cause the processor to perform synchronization operations in a decentralized multi-agent system comprising a plurality of agents, the operations comprising:
receiving, at a second agent of the plurality of agents, a data update message comprising data for a node in a shared data tree comprising a plurality of nodes and a first node context map from a first agent of the plurality of agents, the first node context map comprising last known contexts of all the agents for the node according to knowledge of the first agent, each of the plurality of agents maintaining a separate copy of the shared data tree, and the data update message being sent in response to a change in a copy of the node in the shared data tree maintained by the first agent that desynchronizes the first agent from the second agent;
determining, at the second agent, whether any of three conditions relating to the first node context map and a second node context map is true, the second node context map comprising last known contexts of all the agents for the node according to knowledge of the second agent; and
in response to determining that none of the three conditions relating to the first node context map and the second node context map is true, updating, at the second agent, the node based on the data update message from the first agent,
wherein each agent of the plurality of agents maintains its respective copy of the shared data tree and a respective full context map comprising last known contexts of all of the plurality of agents including itself for each of the plurality of nodes of the shared data tree according to knowledge of the agent, wherein each agent's own context is a maximal context in the respective full context map, and wherein each agent's own context is larger than or equal to other agent's last known context of the agent.

9. The non-transitory machine-readable medium of claim 8, wherein the three conditions comprise: 1) the last known node context of the second agent according to knowledge of the first agent is equal to the last known node context of the first agent according to knowledge of the first agent; 2) the last known node context of the first agent according to knowledge of the first agent is equal to the last known node context of the first agent according to knowledge of the second agent; and 3) there exists a third agent such that the last known node context of the first agent according to knowledge of the first agent is equal to the last known node context of the third agent according to knowledge of the first agent, and the last known node context of the third agent according to knowledge of the second agent is higher than or equal to the last known node context of the first agent according to knowledge of the first agent.

10. The non-transitory machine-readable medium of claim 8, the operations further comprising in response to determining that at least one of the three conditions relating to the first node context map and the second node context map is true, not updating, at the second agent, the node based on the data update message from the first agent.

11. The non-transitory machine-readable medium of claim 8, wherein each respective copy of the shared data tree maintained be each respective agent is the same except immediately after one of the respective agents changes its respective copy of the shared data tree immediately triggering a synchronization across each respective agent.

12. The non-transitory machine-readable medium of claim 8, further comprising:
changing, by the second agent, data for a second node in a copy of the shared data tree maintained by the second agent at the same time that the change in the copy of the node in the shared data tree maintained by the first agent occurs; and
in response to changing the data, sending a second data update message that conflicts with the data update message.

13. The non-transitory machine-readable medium of claim 8, wherein the multi-agent system comprises at least three agents.

14. The non-transitory machine-readable medium of claim 13, wherein the agents of the multi-agent system play equal roles.

15. A data processing system for processing a data update message in a decentralized multi-agent system comprising a plurality of agents, comprising:
a processor; and
a memory coupled to the processor to store instructions, which when executed by the processor, cause the processor to perform synchronization operations in a multi-agent system comprising a plurality of agents, the operations including:
receiving, at a second agent of the plurality of agents, a data update message comprising data for a node in a shared data tree comprising a plurality of nodes and a first node context map from a first agent of the plurality of agents, the first node context map comprising last known contexts of all the agents for the node according to knowledge of the first agent, each of the plurality of agents maintaining a separate copy of the shared data tree, and the data update message being sent in response to a change in a copy of the node in the shared data tree maintained by the first agent that desynchronizes the first agent from the second agent;

determining, at the second agent, whether any of three conditions relating to the first node context map and a second node context map is true, the second node context map comprising last known contexts of all the agents for the node according to knowledge of the second agent; and in response to determining that none of the three conditions relating to the first node context map and the second node context map is true, updating, at the second agent, the node based on the data update message from the first agent, wherein each agent of the plurality of agents maintains its respective copy of the shared data tree and a respective full context map comprising last known contexts of all of the plurality of agents including itself for each of the plurality of nodes of the shared data tree according to knowledge of the agent, wherein each agent's own context is a maximal context in the respective full context map, and wherein each agent's own context is larger than or equal to other agent's last known context of the agent.

16. The data processing system of claim 15, wherein the three conditions comprise: 1) the last known node context of the second agent according to knowledge of the first agent is equal to the last known node context of the first agent according to knowledge of the first agent; 2) the last known node context of the first agent according to knowledge of the first agent is equal to the last known node context of the first agent according to knowledge of the second agent; and 3) there exists a third agent such that the last known node context of the first agent according to knowledge of the first agent is equal to the last known node context of the third agent according to knowledge of the first agent, and the last known node context of the third agent according to knowledge of the second agent is higher than or equal to the last known node context of the first agent according to knowledge of the first agent.

17. The data processing system of claim 15, further comprising in response to determining that at least one of the three conditions relating to the first node context map and the second node context map is true, not updating, at the second agent, the node based on the data update message from the first agent.

18. The data processing system of claim 15, wherein each respective copy of the shared data tree maintained be each respective agent is the same except immediately after one of the respective agents changes its respective copy of the shared data tree immediately triggering a synchronization across each respective agent.

19. The data processing system of claim 15, further comprising:

changing, by the second agent, data for a second node in a copy of the shared data tree maintained by the second agent at the same time that the change in the copy of the node in the shared data tree maintained by the first agent occurs; and in response to changing the data, sending a second data update message that conflicts with the data update message.

20. The data processing system of claim 15, wherein the multi-agent system comprises at least three agents.

21. The data processing system of claim 20, wherein the agents of the multi-agent system play equal roles.

* * * * *